US007047104B2

(12) United States Patent

Perin, Jr. et al.

(10) Patent No.: US 7,047,104 B2

(45) Date of Patent: May 16, 2006

(54) ITEM VENDING MACHINE AND METHOD

(75) Inventors: Joseph C. Perin, Jr., Cincinnati, OH (US); David G. Wagoner, Loveland, OH (US)

(73) Assignee: GIECH Corporation, West Greenwich, RI (US)

( * ) Notice: Subject to any disclaimer, the term of this patent is extended or adjusted under 35 U.S.C. 154(b) by 0 days.

(21) Appl. No.: 10/295,316

(22) Filed: Nov. 15, 2002

(65) Prior Publication Data

US 2003/0120381 A1 Jun. 26, 2003

Related U.S. Application Data

(60) Provisional application No. 60/413,423, filed on Sep. 25, 2002, provisional application No. 60/331,463, filed on Nov. 16, 2001.

(51) Int. Cl.
*G06F 17/00* (2006.01)

(52) U.S. Cl. ...................... 700/232; 700/236; 700/241; 700/244; 273/139; 283/903; 463/17

(58) Field of Classification Search ................ 700/241, 700/231, 232, 236, 242, 244; 273/139; 283/903; 463/17
See application file for complete search history.

(56) References Cited

U.S. PATENT DOCUMENTS

| | | | |
|---|---|---|---|
| 4,107,777 A | 8/1978 | Pearson et al. | |
| 4,412,292 A | 10/1983 | Sedam et al. | |
| 4,982,337 A | 1/1991 | Burr et al. | |
| 5,160,076 A | 11/1992 | Ford | |
| 5,222,624 A | 6/1993 | Burr | |
| 5,282,127 A | 1/1994 | Mii | |
| 5,608,643 A | 3/1997 | Wichter et al. | |
| 5,772,510 A * | 6/1998 | Roberts | 463/17 |
| 5,927,541 A | 7/1999 | Stoken et al. | |
| 5,941,414 A | 8/1999 | Kasper | |
| 5,943,241 A | 8/1999 | Nichols et al. | |
| 5,963,452 A | 10/1999 | Etoh et al. | |
| 5,983,197 A | 11/1999 | Enta | |
| 5,997,170 A | 12/1999 | Brodbeck | |
| 6,181,981 B1 | 1/2001 | Varga et al. | |
| 6,351,688 B1 | 2/2002 | Nichols et al. | |
| 6,356,794 B1 | 3/2002 | Perin, Jr. et al. | |
| 6,714,838 B1 * | 3/2004 | Scrymgeour et al. | 700/242 |
| 6,726,077 B1 * | 4/2004 | Roberts et al. | 225/103 |
| 2001/0049986 A1 | 12/2001 | Roberts et al. | |

FOREIGN PATENT DOCUMENTS

| | | |
|---|---|---|
| CA | 2379687 | 7/2002 |
| WO | WO 94/20908 | 9/1994 |

* cited by examiner

*Primary Examiner*—Khoi H. Tran
(74) *Attorney, Agent, or Firm*—Kenyon & Kenyon

(57) ABSTRACT

An apparatus for dispensing items from a pack of items wherein the pack of items has parameters associated therewith such as pack size, an item dimension and an item price. The apparatus includes an item dispenser, a cash acceptor, input and output devices, and a controller. The controller has an item load table for storing data corresponding to the parameters associated with the pack of items. Thus, the parameters in the item load table can be displayed by the output device in lieu of the parameters being manually entered.

24 Claims, 4 Drawing Sheets

50

| RANK (52) | GAME ID (54) | PACK SIZE (56) | TICKET LENGTH (58) | PRICE (60) | BIN No. OPTIONS (66) |
|---|---|---|---|---|---|
| 1 | | | | | |
| 2 | | | | | |
| 3 | | | | | |
| 4 | | | | | |
| 5 | | | | | |
| 96 | | | | | |
| 97 | | | | | |
| 98 | | | | | |
| 99 | | | | | |
| 100 | | | | | |

ITEM VENDING MACHINE AND METHOD

This application claims the benefit of U.S. Provisional Patent Application Ser. No. 60/413,423 filed Sep. 25, 2002 and 60/331,463 filed Nov. 16, 2001, each of which is hereby incorporated herein by reference.

FIELD OF THE INVENTION

This invention relates generally to the field of dispensing systems and more particularly, to an improved item dispensing system.

BACKGROUND OF THE INVENTION

State sponsored lotteries are a popular and accepted method of generating revenue in place of, or in addition to, taxes. One form of lottery uses instant lottery tickets on which number combinations are preprinted before distribution, thereby permitting the player to immediately view the ticket and know whether he/she is a winner. One system of distributing instant lottery tickets is entirely clerical with the tickets being stored in a drawer and counted out by hand. The clerk typically is responsible for keeping track of the number of tickets sold, making redemption payments and providing such sales and payout information to the state. The state then pays the store owner a commission or other monies due. Such a system has the disadvantages of being completely manual and requiring clerical assistance for the entire transaction. Further, the system has no significant security and is susceptible to shrinkage, that is, theft and accounting errors that result in lost revenue and tickets.

Another system for distributing instant lottery tickets is the instant ticket vending machine ("ITVM"), which is a stand-alone, unattended automated ticket dispenser. The ITVM accepts a customer's cash or credit card payment and provides a selection of lottery tickets corresponding to the payment. The customer then makes various ticket selections having a value equaling the payment. The ITVM monitors the ticket selections and dispenses the lottery tickets selected by the customer. Such a vending machine has the advantages of not requiring the attention of a clerk, being very secure, and providing a high level of reporting by keeping track of how often the machine is accessed to be loaded and serviced, when and how much money is collected, when and which tickets have been selected, etc. The vending machine may also include a printer for printing reports of machine activity.

While the above vending machine has many advantages over the clerical method of distributing instant lottery tickets, it also has several shortcomings. One problem with vending machines for such lottery tickets relates to the loading of tickets into a multi-bin lottery ticket dispensing machine. The long strips of tickets are provided in a batch or pack, and there is certain information associated with that pack that must be entered into the ITVM. With known ITVMs, that information is manually entered into the ITVM using a keypad or the like. Such a process is time consuming, labor intensive and error prone.

Another problem with instant-winner gaming tickets is that a relatively large variety of different games are developed to keep the ticket buyer's interest. This creates additional costs for the lottery ticket issuing organization, requires more dispensing bins per vending machine, and/or more vending machines to dispense the multitude of games that, in turn, increase the machine service requirement.

With known vending machines, ticket verification is often performed when the customer carries a winning ticket to a clerk in a store, who then inserts it into a machine, which reads the code on the back of the ticket and ascertains whether the ticket so identified is, indeed, a winner, and to verify the winning amount. When this verification is complete, the holder is paid the winnings. Although this procedure minimizes certain kinds of errors and fraud, it does not detect a ticket that has come into the possession of the holder by means other than by a legitimate purchase.

Therefore, there is a need for an improved ticket vending machine that addresses the above problems with known machines.

SUMMARY OF THE INVENTION

The present invention provides an easier and more efficient ticket loading process that has the advantages of saving time and reducing errors and the service costs associated with those errors. The ticket loading process of the present invention permits packs of tickets to be loaded without requiring the entry of any data relating to the tickets. With the ticket loading process of the present invention, the ITVM assumes that the tickets being loaded are identical to the previously loaded tickets and requires only that the person loading the tickets confirm that assumption. The ticket loading process of the present invention has significant benefit with an ITVM that is expected to dispense a large number of different games that have tickets of different sizes and values. A further feature of the present invention is the capability to activate or release a pack of tickets for redemption simultaneously with the pack of tickets being loaded in an ITVM. That feature makes it very difficult to redeem tickets that have leaked from the system through theft or another form of loss.

According to the principles of the present invention and in accordance with the described embodiments, the invention provides an apparatus for dispensing items from a pack of items. The pack of items has parameters associated therewith such as pack size, an item dimension and an item price. The apparatus includes an item dispenser, a cash acceptor, input and output devices and a controller connected to the item dispenser, the cash acceptor and the input and output devices. The controller has an item load table for storing data corresponding to the parameters associated with the pack of items. Thus, the parameters in the item load table can be displayed by the output device in lieu of the parameters being manually entered.

In another embodiment, the invention provides a method of loading a pack of items in a bin of an item dispensing machine by initiating an item load process using a controller in the machine. First, the controller creates a display of first data relating to old items previously stored in the bin. The controller then automatically stores the first data in the controller as data to be associated with the new items in response to receiving the entry from the user representing an acceptance of the first data. Alternatively, the controller automatically stores in the controller second data relating to the new items in response to receiving the second data.

In a further embodiment, the invention provides an apparatus for dispensing items from a pack of items, wherein the pack of items has a pack identification code. The apparatus includes an item dispenser, a cash acceptor, an input device providing data representing the pack identification code, and a controller connected to the item dispenser, the cash acceptor and the input device. The controller has a memory for storing the data representing the pack identification code. In addition, the apparatus includes a remote computer located geographically remotely from the item dispenser. The remote computer receives the data representing the pack identification code from the controller and activates the pack of items for sale. Thus, when an item is submitted for redemption, if the item is in a pack that has been activated, an authorization to redeem the item is given.

These and other objects and advantages of the present invention will become more readily apparent during the following detailed description taken in conjunction with the drawings herein.

DETAILED DESCRIPTION OF THE INVENTION

Figures 1, 3:
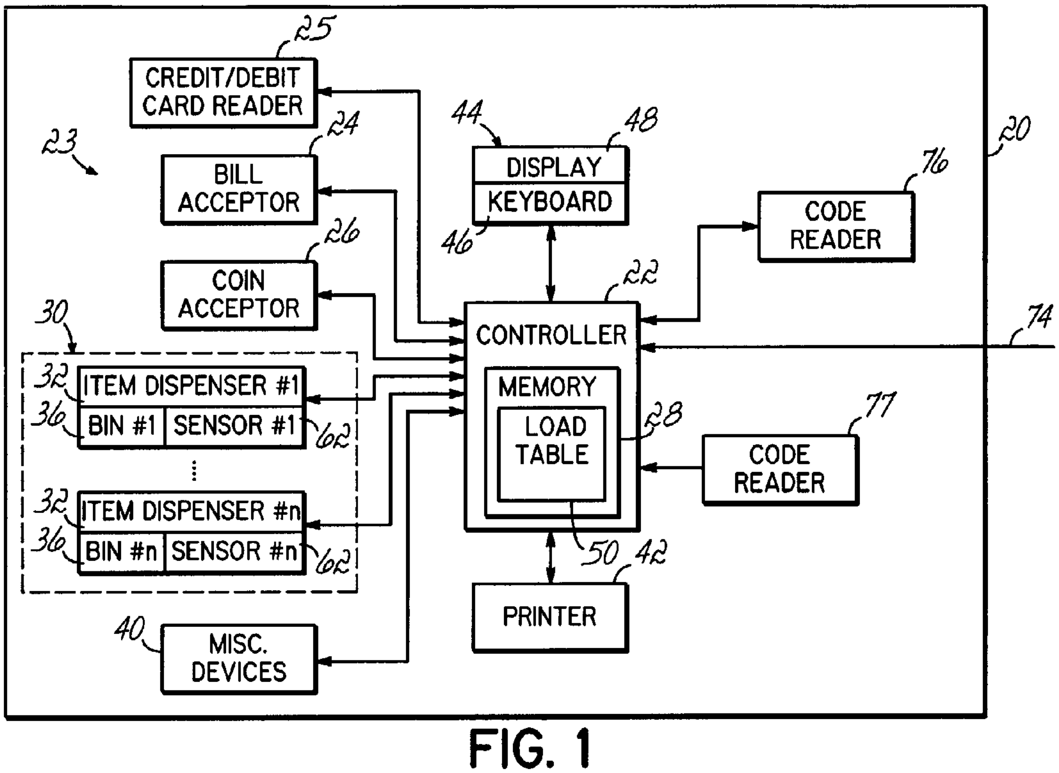
FIG. 1 is a schematic block diagram of an ITVM.
FIG. 3 is a representation of a load table that is maintained in the ITVM and used with the process of FIGS. 2 and 2A.

Referring to FIG. 1, an item dispenser 20, for example, an ITVM, is used to vend and dispense lottery tickets that are printed in long strips, wherein each ticket is separable from another ticket by a perforation line. The tickets are generally stored in a fan-fold form and shipped in a sealed pack. Item dispensers similar to the ITVM 20 are shown and described in U.S. Pat. Nos. 4,982,337; 5,222,624; 5,772,510; 5,836,498 and 5,943,241, each of which are hereby incorporated in its entirety by reference.

The ITVM 20 has a controller 22 in electrical communications with payment receiving and storing devices 23, for example, a bill acceptor 24, credit debit card reader 25 and coin acceptor 26. Both the bill acceptor 24 and coin acceptor 26 provide signals to the controller 22 that are indicative of the operation of the respective devices. The controller 22 analyzes or manages the signals being provided by the bill and coin acceptors 24, 26 to determine their proper operation as well as any fault conditions that may occur. The controller 22 is thus able to determine the numbers of bills and coins accepted, the cash values of the bills and coins accepted, and the total value of the cash payments held in the ITVM 20. It should be noted that payments may also be made by a credit card, debit card or other means, and the values of those payments is also tracked by the controller 22. Those data values are stored in memory 28 connected to the controller 22.

The controller 22 is also in electrical communications with an item dispenser 30 that is comprised of one or more, for example, up to 24 or more, item dispensing modules 32. Further, each of the item dispensing modules 32 has a respective bin 36 in which a pack of items or tickets is placed for dispensing. The item dispensing modules 32 have various solenoids, motors, lights, etc., which are operated by command signals originating with the controller 22. In addition, the item dispensing modules 32 have various proximity detectors and other devices that provide feedback signals to the controller 22. In controlling the operation of the item dispensing modules 32 the controller 22 is able, via feedback signals from the item dispensing modules 32, to detect various operating states as well as fault conditions.

In a known manner, the controller 22 also provides command or data signals to, and receives feedback signals from, other miscellaneous devices 40 that are not shown, for example, lights, motors, limit switches, solenoids, etc., within the ITVM 20. The controller 22 is also in electrical communication with a printer 42 that is used to provide reports with respect to the operation of the ITVM 20. The ITVM 20 has a user I/O interface 44 that has input devices 46, for example, a keyboard, pushbuttons, etc, that permit data to be entered into the ITVM, and output devices 48, for example, an alphanumeric display, lights and devices that provide other sensory perceptible information. As will appreciated, the input and output devices can be combined into a single device such as a touch screen monitor, and the I/O interface 44 can be connected to the controller 22 by wired or wireless means.

The obligation to maintain adequate item or ticket inventories in the ITVM 20 is often undertaken by a person at the site of the ITVM. Tickets are often provided in long strips that are packaged in a batch or pack, and when each new pack of tickets is loaded in a bin, there is certain information associated with the pack of items or tickets that must be entered into the ITVM. For example, the controller 22 must be provided with information relating to the type of items or the identity of the game represented by the tickets and the item or ticket pack size, that is, the number of items or tickets in the pack. Other information includes an item dimension or the length of the ticket, that is, the distance between perforations and the price of the item or ticket. Often the person who loads tickets into an ITVM is a clerk in a store who is also occupied with other tasks. Thus, it is a significant inconvenience to that person to have to ask customers to wait while a new pack of tickets is loaded into the ITVM 20; and pack related data is manually entered using the keyboard 46. Further, under such conditions, stress levels increase; and there is a higher probability that the item or ticket related data will be entered incorrectly.

To alleviate that situation, the ITVM 20 further includes a load table 50 within the memory 28. The load table has a number of records represented by the rows in the table that indicate a history of the different types of items or ticket games represented by respective packs of items or tickets that have been loaded in the ITVM 20. The table 50 has an arbitrary size, for example, 100 records or rows, that permits data relating to the last 100 different types of items or ticket games loaded in the ITVM to be stored in the load table 50. Each record has fields represented by the columns in the table wherein a column 52 relates to the rank or relative age of the games in the table. Row 1 represents the most recent type of item or ticket game loaded into the ITVM 20, and row 100 represents the oldest type of item or ticket game that was loaded into the ITVM. The data in column 54 is a numerical designation uniquely identifying a type of item or ticket game associated with a respective pack of items or tickets, and the data in column 56 is the size of the pack of items or tickets, that is, the total number of items or tickets in a respective pack. The data in column 58 is an item dimension or ticket size, that is, the length of each ticket or the distance between fanfold perforations. The data in column 60 is the price of each item or ticket. The data in the load table 50 permits the process of FIGS. 2 and 2A to provide a quicker and more accurate method of loading a pack of items or tickets into the ITVM 20.

Figure 2:
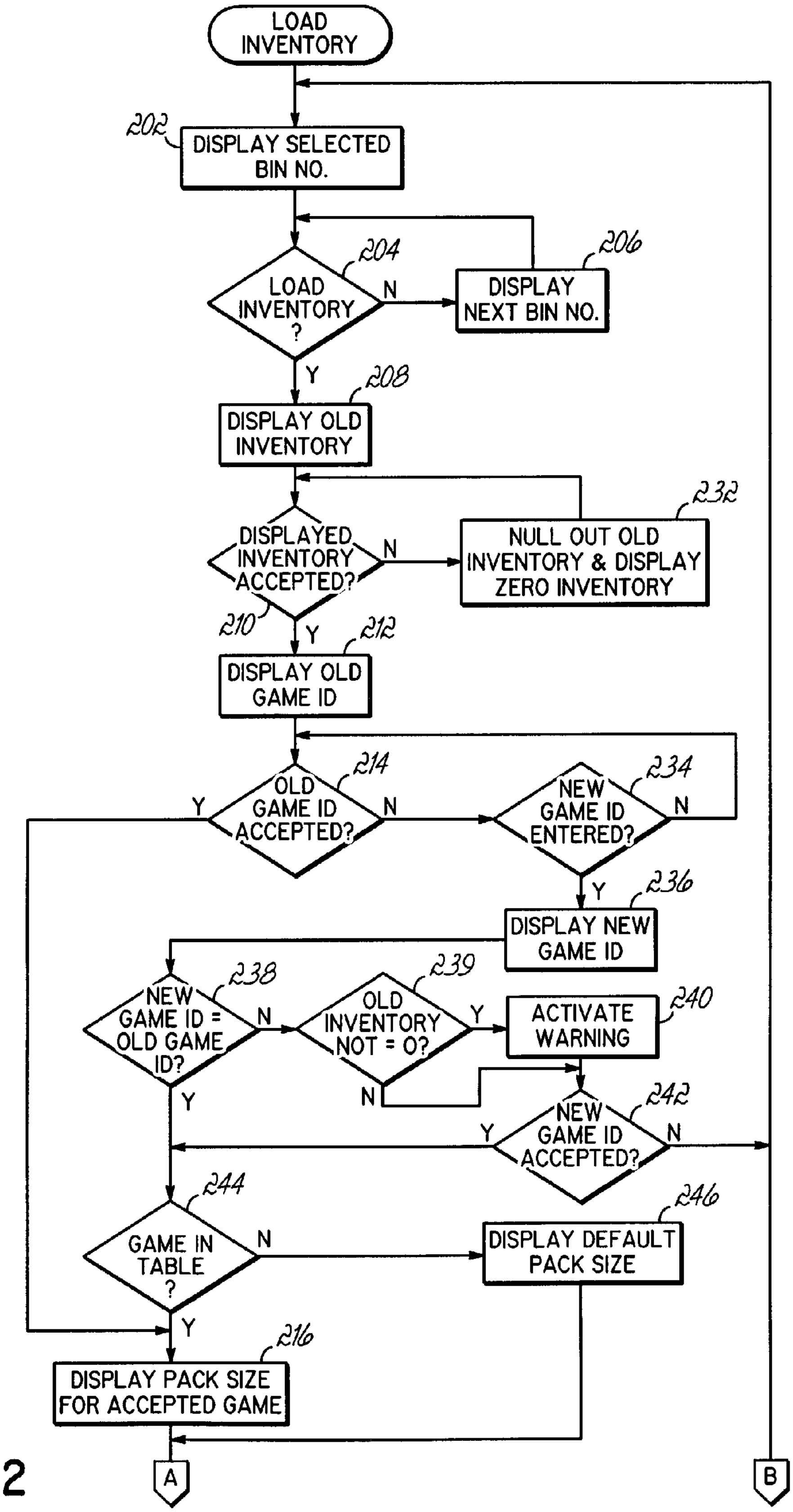
FIGS. 2 and 2A collectively illustrate a flowchart of a process for loading data relating to a pack of tickets into the ITVM of FIG. 1 in accordance with the principles of the present invention.
Figure 2A:
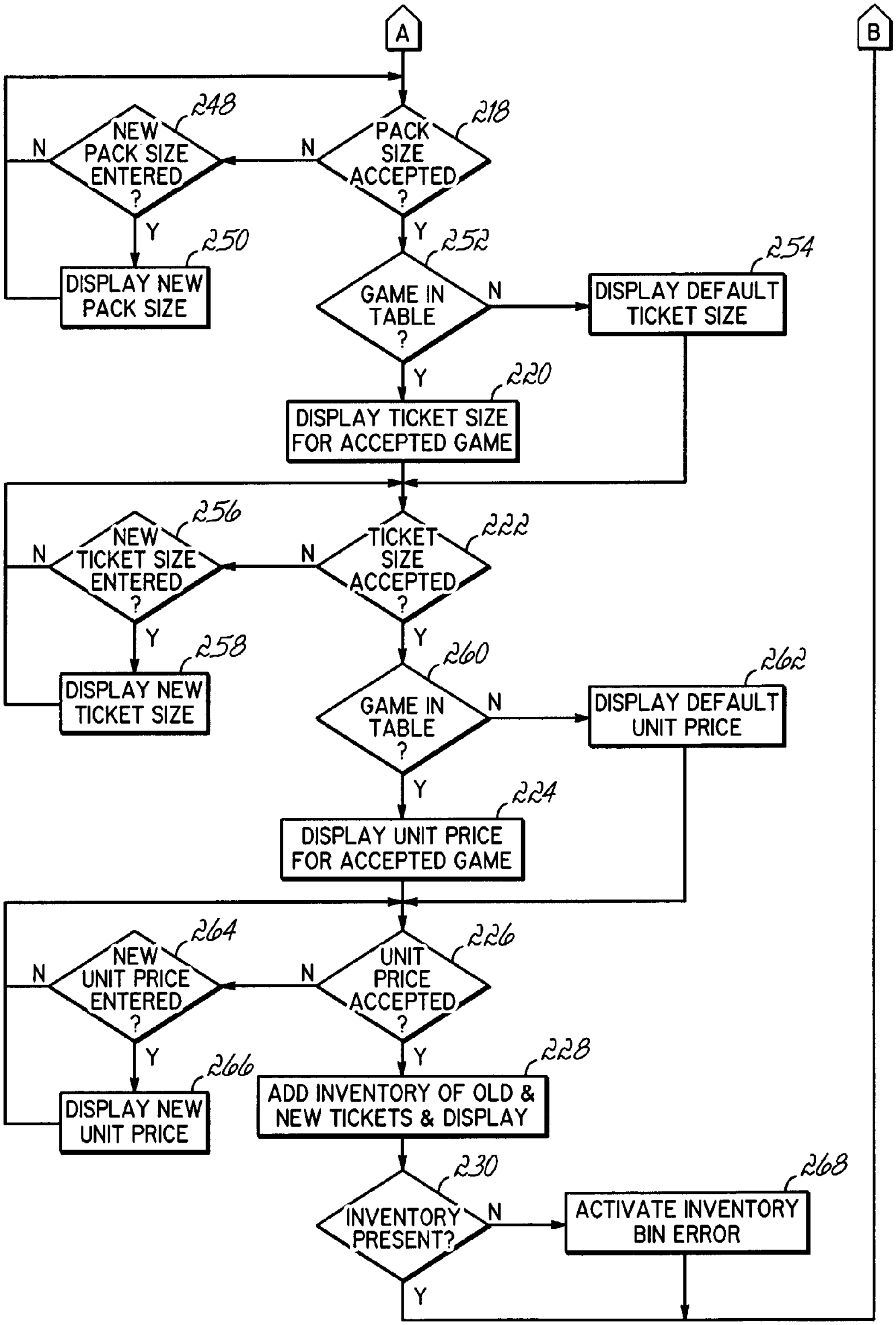

FIGS. 2 and 2A relate to a process for loading a pack of items or tickets into one of the bins of the ITVM 20. When it is determined that a pack of tickets is to be loaded into the ITVM 20, a service door in the cabinet is opened to provide access to the keyboard 46, display 48 and bins 36 in which the tickets are stored. The keyboard 46 is used to select an inventory load mode or cycle. Upon receiving that selection, the system controller 22 then provides, at 202, a display of a bin number selected by the user using the keypad 46. If the displayed bin number is correct, a pushbutton or key on the keyboard 46 is used to provide a "yes" input. If not, a pushbutton or key on the keyboard 46 is used to provide a different bin number that is displayed at 206. In response to a "yes" input, the control 22 then displays, at 208, any remaining ticket inventory, that is, the number of tickets, remaining in that bin. If the tickets to be loaded represent the same as the old tickets in the bin, the old ticket inventory may be utilized. If at 210, the old ticket inventory is accepted as indicated by a "yes" input, the controller 22 then displays, at 212, the identity of the old game in the bin. Known controllers have a bin specific memory array that keeps track of the identity of the most recent game in a bin.

In this embodiment, the person servicing the ITVM must have knowledge of the parameters associated with the new pack of tickets. Some parameters such as price are printed on each ticket. Other parameters are known through experience; and in some applications, the parameters are printed on a label associated with the new pack of tickets. If the new pack of tickets is for the same game as the old game, the controller detects, at 214, a "yes" entry. The controller then reads the pack size from column 56, that is, the number of tickets in the pack, associated with the accepted game ID that is in column 54. That pack size is then displayed at 216. If the new pack of tickets has a number of tickets equal to the displayed pack size, the controller 22 detects, at 218 (FIG. 2A), a "yes" entry and proceeds to determine, at 252, whether the accepted game is in the load table 50. Then, a value for the ticket size or length parameter is read from column 58 of table 50 that is associated with the accepted game ID; and that ticket length is displayed at 220. If the new ticket pack to be loaded has tickets of the same size, the controller then detects, at 222, a "yes" entry and proceeds to read a ticket price from column 60 associated with the accepted game identity. That ticket price is then, at 224, displayed. If the price of tickets in a new pack of tickets is the same, the controller detects, at 226, a "yes" entry and proceeds, at 228, to display the sum of the remaining inventory of tickets plus the pack size for the pack of tickets to be loaded. The controller then reads, at 230, a state of a sensor 62 in the selected bin; and if the sensor indicates that a ticket inventory is present, the control 22 then returns to display, at 202, the first bin number. At this point, if desired, other packs of tickets can be loaded utilizing the same process. If the inventory sensor 62 for the selected bin does not detect an inventory present, the controller 22 then activates an inventory bin error at 268, which results in an error display and/or other signals as appropriate.

The above ticket loading process also has the versatility to easily change any of the parameters. For example, if, at 210 of FIG. 2, the controller 22 detects a "no" entry representing a rejection of the displayed inventory, the controller then, at 232, proceeds to display a zero inventory. Similarly, if the controller, at 214, detects that the old game ID is not to be accepted, it then, at 234, detects in entry of a new game ID and displays the new game identity at 236. The controller 22 then determines, at 238, whether the new game identity is the same as the old game identity; and thereafter determines, at 239, whether there is an inventory of old tickets, that is, a nonzero inventory. If so, a warning is activated, at 240, that requires an acceptance of the new game ID. If the controller 22 determines, at 242, that the new game identity is accepted, it then determines, at 244, whether the accepted game identity is a record in the load table 50. If so, the controller 22 reads and displays, at 216, the value of the pack size parameter for that record from column 56 . However, if the new game ID does not exist as a record in the load table 50; the controller 22 then displays default values for the pack size at 216.

If a default value is displayed at 216, the user, at 218 of FIG. 2A, does not accept the pack size, and the controller 22 detects, at 248, and displays, at 250, an entry of a new pack size. Upon detecting an acceptance of the pack size, at 218, the controller 22 determines, at 252, if the accepted game ID is in the load table 50. If so, the controller 22 reads and displays, at 220, the value of the ticket size parameter for that record from column 58. If not, the controller 22 loads and displays a default ticket size at 254. The controller 22 then detects, at 256, and displays, at 258, an entry of a new ticket size. Upon detecting an acceptance of the new ticket size at 222, the controller 22 determines, at 260, whether the accepted game ID is in the load table 50. If so, the controller 22 reads and displays, at 224, the value of the ticket or unit price parameter for that record from column 60. If not, the controller 22 loads and displays a default unit or ticket price at 262. Upon detecting an acceptance of the new ticket size at 226, the controller loads a new record in the table comprising the new game ID and all of the parameter values that have been accepted in association with the new game ID.

With the above ticket loading process, if the new pack of tickets is for the same game as the pack previously loaded in the bin, it is not required that any data be entered. It is only required that a "yes" pushbutton or response be input six times to confirm that the parameters associated with the new pack of tickets are identical to the parameters of the old pack of tickets. Thus, as will be appreciated, the ticket loading process is easier, faster and much less stressful than known methods of loading new packs of tickets into an ITVM 20. Further, as the number of different games results in a greater number of tickets of different size and value, the ease, simplification and speed of the above ticket loading process provides even greater savings of time and reductions in errors and stress.

Figure 4:
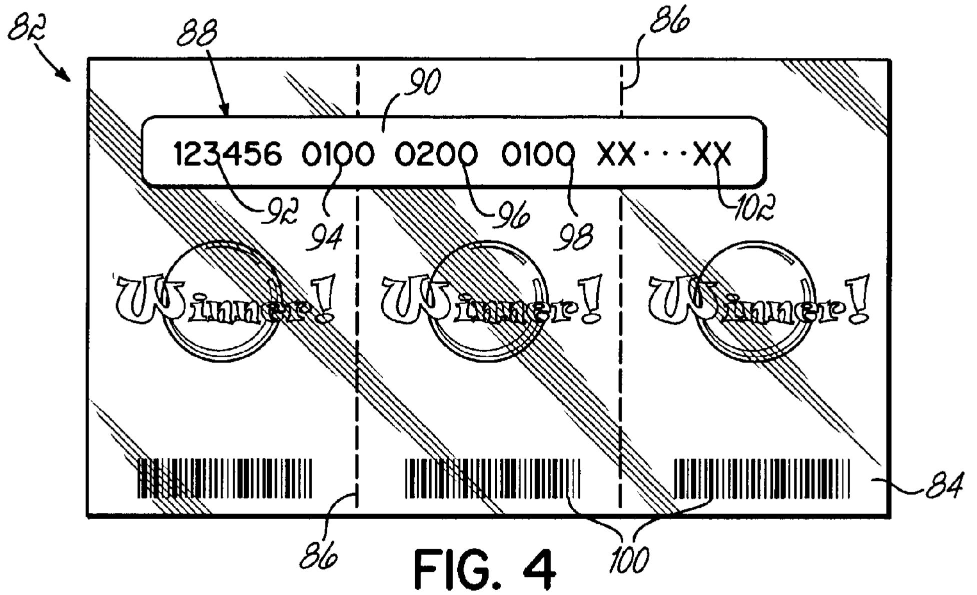
FIG. 4 is a schematic illustration of a pack of tickets containing a human and machine readable label with a pack identification code.

With the above embodiment, if the new pack of tickets represents a new game that has not been previously loaded into the ITVM 20, then the parameters for the new game are not contained in the load table 50. In that situation, it is necessary for the person loading the new pack of tickets manually enter the parameters associated with that new game. In another embodiment, the ticket loading process can be further simplified by using a code reader 76, for example, a bar code scanner, that is electrically connected to the controller 22 using, for example, an RS-232 link. Further, as shown in FIG. 4, a pack of tickets 82 is comprised of a fanfold of tickets 84 that are separated from each other by perforations 86. The pack of tickets 82 further includes a pack identification label 88 with a machine readable code 90, for example, a bar code, having indicia 92 in machine readable and/or human readable form representing at least a game ID. The code 90 may also contain indicia 94, in machine readable and/or human readable form, representing the pack size or number of tickets in the pack; and indicia 96, in machine readable and/or human readable form, representing the length of the ticket, that is, the distance between perforations 86. The code 90 may further include indicia 98, in machine readable and/or human readable form, representing the ticket price.

If using the code reader 76, referring to FIG. 2, the load inventory process is initiated in a manner previously described to where the controller 22 displays, at 212, the old game ID. The controller 22 then displays a message providing the person loading the tickets the option of reading the pack identification label 88 with the code reader 76. Assuming the code 90 contains all of the information discussed above, the controller 22 receives and decodes the machine readable indicia 92–98 in a known manner and buffers or stores data representing game ID, pack size, ticket size or length and the ticket price.

If the controller 22 detects an entry accepting the old game ID, at 214, indicating that the game ID of the new pack of tickets is the same as the old, the controller 22 proceeds to display, at 216, the pack size, that is, the number of tickets in the new pack of tickets. If the pack size is accepted by the operator inputting a "yes", the controller 22 proceeds to display, at 220, the ticket size and thereafter, the unit price for the accepted game at 224. Thus, if the old game ID and the new game ID are the same, the person loading the tickets can quickly by depressing the "yes" button on the keyboard 46 complete the inventory loading process.

Using a code reader to read the pack identification code also simplifies the inventory loading process in the event that the game ID of the new pack of tickets is not found in the load table 50. In that event, if the person loading the tickets does not accept, at 214, the old game ID, the controller 22 can immediately display the game ID that is buffered from reading the pack identification code 90. Upon the new game ID being accepted, at 242, the controller 22 proceeds to display, at 216, the pack size that was read by the code reader 76. Upon the displayed pack size being accepted at 218, the controller 22 displays, at 220, the buffered ticket size. Upon the ticket size being accepted at 222, the controller displays, at 224, the buffered unit price. Upon the ticket price being accepted at 226, the controller 22 then proceeds to write a record into the table comprising the read and accepted game ID along with the accepted parameters for pack size, ticket size and ticket price. Thus, if the new pack of tickets represents a game not in the table 50, reading the pack identification code with the code reader automatically buffers the parameters associated with the new game into the controller 22; and the person loading the pack of tickets simply confirms that the parameters are correct without having to enter any numerical data. After the parameters have been accepted, the controller automatically adds the new game ID and its associated parameters to the load table 50.

Further, if for any reason, the person loading the tickets determines that any one of the parameters is incorrect, in a manner as previously described, the load inventory process of FIGS. 2 and 2A permits that person to enter different data for the system to use. As will be appreciated, the pack identification code can be on a label 88 associated with the pack of tickets 82 or at a different location, for example, embedded within a machine readable code 100 on each of the tickets 84.

Figure 5:
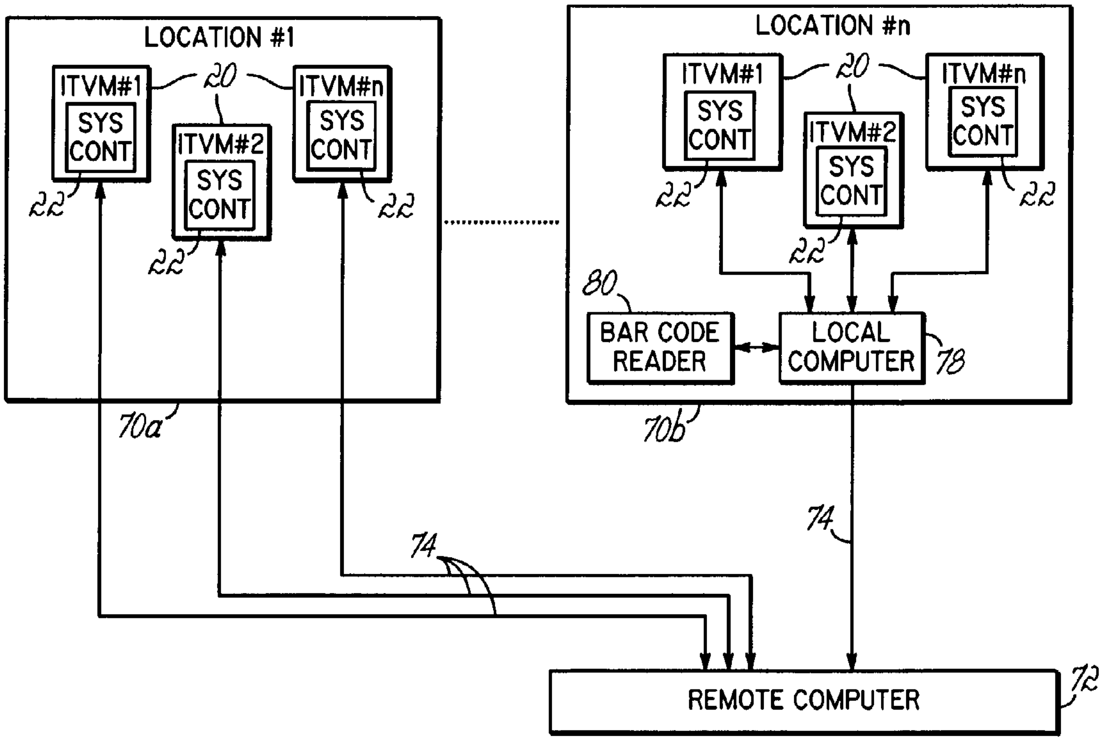
FIG. 5 is a schematic block diagram of a system in which a central computer tracks the operation of ITVMs at different locations.

Referring to FIG. 5, in many applications, one or more ITVMs 20 are provided at locations 70 that may be any location including a commercial retail establishment. A further benefit can be realized if the ITVMs 20 are connected via communications links 74 to a remote computer 72 that is accessible to the issuer of the tickets. The remote computer 72 is normally at a location geographically remote from the locations 70. As will be appreciated, the schematic showing of a remote computer 72 in FIG. 5 is understood to be either a single computer or a plurality of computers. For example, the remote computer 72 may be a combination of a host computer under the control of a vendor of the ITVMs and another computer under the control of the issuer of the tickets, for example, a state agency. The other computer may be geographically remotely located from the host computer. Further, the remote computer 72 may be a plurality of remote computers connected into a network of computers or implemented in another configuration. Further, as will be appreciated, any type and combination of communications links 74 may be established between system controllers 22 and the remote computer 72. The choice of a configuration of one, or a combination of, communications links will depend on many factors such as the availability of different communications resources, their respective costs, etc. Such communications links may be wired or wireless, for example, a telephone link, an internet link, a cable link, a satellite link, an RF link, etc. The selection of a communications link configuration and the frequency of data transmissions to the remote computer will also depend on previously described factors, for example, the number of ITVMs 20 at a location, their level of activity, the requirements of the item vendor, for example, a state authority, the requirements of an ITVM service provider, etc.

In another embodiment of the load inventory process of FIGS. 2 and 2A, the remote computer can provide the parameters associated with a particular game ID. For example, if the new pack of tickets represents a game not currently in the load table 50, using any of the embodiments described earlier, upon a new game ID being accepted, at 242 of FIG. 2, the controller 22 initiates the loading of a new record in the load table 50 by entering the new game ID in the game ID column 54. The controller 22 also initiates communication with the remote computer and transfers the new game ID to the remote computer 72. The remote computer 72 then transfers or downloads to the controller 22 the parameters associated with that new game ID. Thereafter, the controller 22 continues to execute the inventory load process of FIGS. 2 and 2A and, in a manner as previously described, displays those parameters at 216, 220 and 224. After all of the values for the pack size, ticket size and ticket price parameters of a particular game ID have been accepted, or new values entered and accepted, the controller 22 enters a new game ID record in the load table 50 that has the accepted parameter values.

As a further feature, the handling of the pack of tickets can be further secured. For example, it is possible for a pack of tickets to "leak" out of the system without the knowledge of the issuer of the tickets. If one of those tickets is a winning ticket, it can be redeemed without the ticket having been purchased, and those who have purchased tickets are denied the opportunity to win. Thus, it is desirable that the issuer of the pack of tickets, for example, a state agency, not permit tickets in the pack of tickets that have leaked out of the system to be redeemed. With the invention of FIG. 5, the issuer can refuse to redeem tickets that have not been activated or released as part of the inventory loading process.

The activation process requires that the machine readable code 90 (FIG. 4) on the pack identification label 88 also include indicia 102, in machine or human readable form, representing a pack identification code. Thus, upon the pack of tickets being loaded into the ITVM 20, the pack identification code indicia 102 is entered into the controller 22 using the keyboard 46 (FIG. 1) or the code reader 76 connected to the controller 22. The pack identification code 102 is then transmitted via the communications link 74 (FIG. 5) to the remote computer 72. The issuer of the pack of tickets has access to the remote computer 72, and having received the pack identification code, the issuer knows that the pack of tickets is now loaded in an ITVM 20. At that time, the issuer then activates or releases the tickets in that pack of tickets for redemption. In other words, if before activating or releasing that pack of tickets, a ticket in that pack is presented for redemption, redemption will be refused. However, after the pack of tickets is activated, the tickets in that pack are redeemable. In addition, upon activation, via a known process in many applications, funds covering the cost of the purchase of that pack of tickets by a vendor, for example, a retail store, are transferred from an account of the ticket vendor to an account of the ticket issuer, for example, the state agency.

The checking of released tickets may be handled in several ways. Each of the tickets has a unique ticket identification code 100 (FIG. 4). In one embodiment, referring to FIG. 5, a ticket can be submitted for redemption at one of the ITVM machines 20 at location 70*a*. Each of the machines 20 has a code reader 77 (FIG. 1) that is connected to the controller 22 and is installed such that it can be used by the person who is submitting the ticket for redemption. The ticket code 100 (FIG. 4) is read by the code reader 77, and the controller 22 passes the ticket code information to the remote computer 72. In addition, the person redeeming the ticket is often asked to key in a pin number that is also found on the ticket, and the ITVMs also provide a keypad (not shown) that is accessible to the user for that purpose. If the pin number is correct and the ticket was properly activated, the remote computer 72 downloads an authorization to "pay off" the ticket, and the controller 22 awards the person redeeming the ticket credit toward the purchase of other tickets or another prize.

In an alternative embodiment, the remote computer 72 can download to the controllers 22 at location 70*a*, or to the local computer 78 at location 70*b*, the information necessary to redeem the tickets loaded in the ITVMs at those locations. Thus, when a ticket is submitted to be redeemed for a prize, the ticket identification code can be scanned by a bar code reader 77 (FIG. 1) connected to the controller 22 or a bar code reader 80 that is connected directly to the local computer 78. The bar code reader 80 may be a UPC scanner that is located at a checkout counter of a retail establishment. Upon the ticket identification code being scanned, it is compared by the local computer 78 with the downloaded release ticket information. If a comparison is detected, the prize is awarded. However, if the ticket being redeemed does not have corresponding release information, redemption of the ticket will be refused; and a prize will not be awarded. Whether the authorization to redeem a ticket is originated locally or by the remote computer 72 often depends on the value of the ticket.

As will be appreciated, in any of the described embodiments, the ticket identification code can be entered using another device, for example, the keyboard 46 or a similar device. The above ticket loading and activation processes make it very difficult to redeem tickets that have leaked from the system through theft or another form of loss.

The communications links 74 between the controllers 22 and the remote computer 72 provides a further feature. Tickets, or replicas thereof, associated with the bins 36 of an ITVM 20 can be viewed by prospective customers from the front of the ITVM. Currently, the number and types of games in an ITVM and their association with a particular bin is determined at the retail level and to some extent, is left to the discretion of the person loading tickets into the ITVM. The issuer of the tickets, for example, the state agency or a retail chain that makes ITVMs available, may desire that particular games be associated with particular bins, so that all of the ITVMs in a particular group of stores or in a geographic area appear the same to prospective customers. Such uniformity facilitates use of the ITVM by the customer. That uniformity is also facilitated with the load table 50.

In this embodiment, the load table 50 has another column 66 containing values identifying bin placement options, that is, the identity of the bins in which an associated game can be loaded. For example, a particular game may be loaded in one or all of the bins of an ITVM. Therefore, during an inventory load process, game ID data is input to the controller 22 either manually or via the code reader 76 as previously described. The controller 22 then transfers that game ID to the remote computer 72, and the remote computer downloads to the controller 22 the parameters associated with the game ID including the bin numbers into which that game is allowed to be loaded.

Referring to FIG. 2, the inventory load process 2 is initiated as previously described. The person loading the pack of tickets selects a load inventory cycle, and a selected bin number is displayed at 202. The process is executed as previously described until the person loading the pack of tickets accepts either the old game ID at 214 or the new game ID at 242. In this embodiment, computer 72 has caused all of the parameters associated with all of the game ID's to be loaded in the load table 50, and consequently, it is possible to eliminate the confirmation of the parameters by the person loading the tickets. Therefore, the inventory load process can go directly from either of the steps 214 or 242 to step 228 of FIG. 2A at which the total inventory of tickets in the selected bin is displayed.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, in the described embodiment, the ticket loading process was described with respect to tickets; however, as will be appreciated, the ticket loading process and vending machine can be applied to other items, for example, phone cards, etc.

Therefore, the invention in its broadest aspects is not limited to the specific details shown and described. Consequently, departures may be made from the details described herein without departing from the spirit and scope of the claims which follow.

What is claimed is:

1. A method of setting up an item dispensing system having a bin for storing items and a controller with a user I/O device permitting a user to enter data and view output data displayed by the controller, the controller being in electrical communications with a remote computer located geographically remotely from the controller, the method comprising:

providing a pack of items to be loaded in the bin of the item dispensing machine, the pack of items having a pack identification code;

initiating an item load process with the controller;

reading the pack identification code with a code reader;

transferring from the controller to the remote computer first data represented by the pack identification code;

receiving with the controller from the remote computer an activation command;

automatically activating in response to the activation command, a record in a data table having data associated with the new items, thereby allowing a supplier of the items to control dispensing of the items.

2. The method of claim 1 wherein the data represents data selected from a group of data consisting of an identity of the new items, a quantity of the new items, a size of the new items and a price of the new items.

3. A method of setting up an item dispensing machine having bins for storing packs of items and a controller with a user I/O permitting a user to enter data and view output data displayed by the controller, the controller being in electrical communications a remote computer located geographically remotely from the controller, the method comprising:

providing a pack of items to be loaded in one of the bins of the item dispensing machine, the pack of items having a pack identification code;

initiating an item load process with the controller;

selecting the one of the bins;

reading the pack identification code with a code reader;

transferring from the controller to the remote computer first data represented by the pack identification code;

receiving with the controller a command from the remote computer;

automatically loading data in a data table associated with the new items in response to the command.

4. The method of claim 3 further comprising receiving from the remote computer the data associated with the new items.

5. The method of claim 4 wherein the data represents data selected from a group of data consisting of a type of the new items, a size of the pack of new items, an item dimension and a price of the new items.

6. The method of claim 4 wherein the data represents an identity of the bin into which the pack of items can be loaded.

7. The method of claim 3 wherein the command includes the data.

8. The method of claim 3 wherein the command identifies a location of the data.

9. The method of claim 3, wherein the items are lottery tickets.

10. The method of claim 9, wherein the lottery tickets are instant-win lottery tickets.

11. The method of claim 10, wherein the instant-win lottery tickets are scratch-off lottery tickets.

12. The method of claim 9, wherein the lottery tickets are joined in a fan-fold arrangement by lines of weakness to form the pack.

13. The method of claim 2, wherein the data includes an identity of the new items.

14. The method of claim 2, wherein the data includes a quantity of the new items.

15. The method of claim 2, wherein the data includes a size of the new items.

16. The method of claim 2, wherein the data includes a price of the new items.

17. The method of claim 1, wherein the items are lottery tickets.

18. The method of claim 17, wherein the items are instant-win lottery tickets.

19. The method of claim 18, wherein the instant-win lottery tickets are scratch-off lottery tickets.

20. The method of claim 17, wherein the lottery tickets are joined in a fan-fold arrangement by lines of weakness to form the pack.

21. The method of claim 5, wherein the data includes the type of the new items.

22. The method of claim 5, wherein the data includes the size of the pack of new items.

23. The method of claim 5, wherein the data includes the item dimension.

24. The method of claim 5, wherein the data includes the price of the new items.

* * * * *